May 22, 1962     H. A. MITCHELL ET AL     3,036,151

ULTRA-SONIC RECORDING SYSTEM

Filed Oct. 12, 1959     2 Sheets-Sheet 1

INVENTORS
HUGH A. MITCHELL
LEON D. FURON
DONALD R. MODISPACHER

BY *Elliott & Pastoriza*
ATTORNEYS

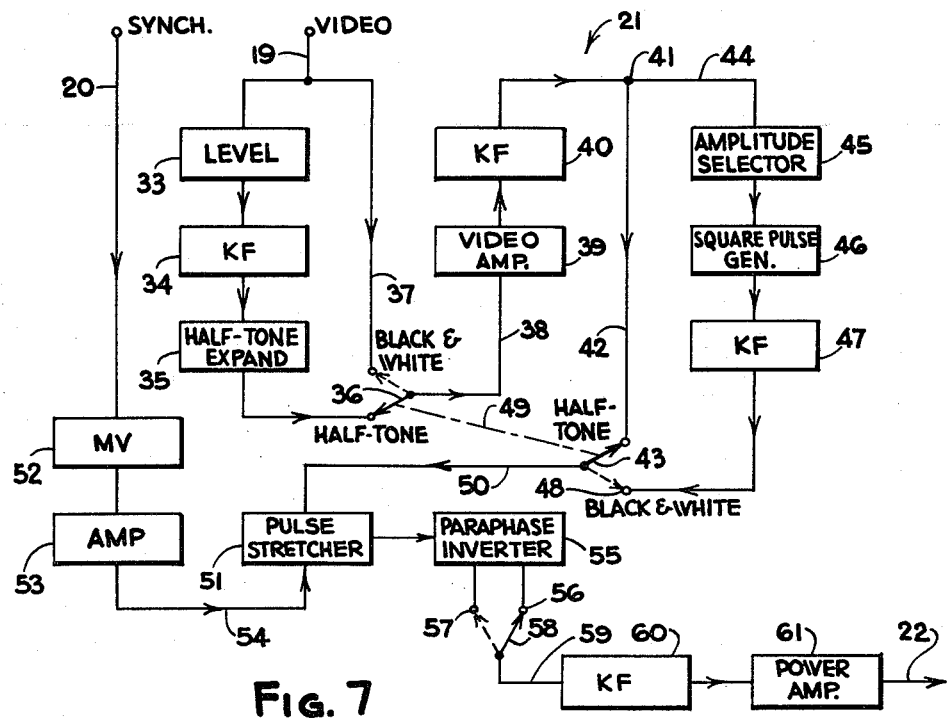
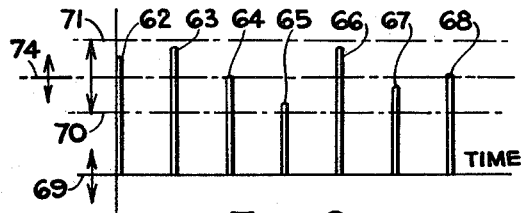
FIG. 8
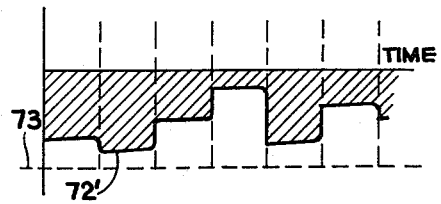
FIG. 10
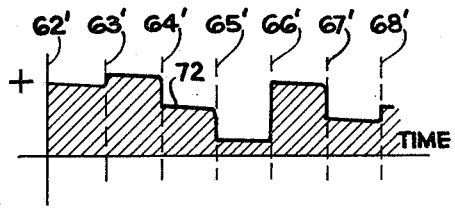
FIG. 9
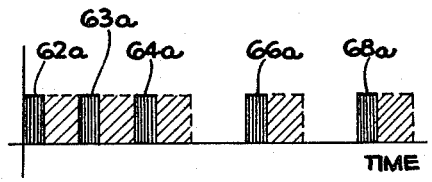
FIG. 11

United States Patent Office 3,036,151
Patented May 22, 1962

3,036,151
ULTRA-SONIC RECORDING SYSTEM
Hugh A. Mitchell, Torrance, Leon D. Furon, Glendale, and Donald R. Modispacher, Encino, Calif., assignors, by mesne assignments, to Curtiss-Wright Corporation, a corporation of Delaware
Filed Oct. 12, 1959, Ser. No. 845,738
5 Claims. (Cl. 178—6.6)

This invention relates generally to ultra-sonic systems in which an ultra-sonic probe and circuit transmit sound energy into a material and receive echo signals of amplitude indicative of the structural integrity of such material. More particularly, it has to do with an improved recording system providing facsimile type records of the information contained in the echo signals.

Ultra-sonic systems for analyzing structures are well-known in the art and find wide application, for example in quality control processes for detecting flaws. The conventional ultra-sonic system includes a sonic circuit connected to the sound transmitting and receiving probe. This sonic circuit generally includes an oscilloscope which provides a visual display of the transmitted sound signal and the received echo. Variations in the amplitude of the echo indicate variations in the structural integrity of the material when the probe is scanned over the material being inspected.

To provide a permanent type record, it has been the practice to simply photograph the oscilloscope screen. This process involves, in addition to the required photographic equipment, time and effort in developing the film and interpreting the results.

With the foregoing in mind, it is a primary object of the present invention to provide, in combination with an ultra-sonic system, an improved recording circuit in which visual, permanent recordings or records of the information derived from echo pulses are made during the actual inspecting process, thereby eliminating the necessity of photographing, developing and interpreting film.

More particularly, it is an object to provide an improved recording system of the facsimile type in which the resulting picture corresponds substantially to the structure of the material under inspection to the end that interpretation of the information contained in the echoes is greatly facilitated and an overall composite picture of the material itself is readily available.

Another important object of the invention is to provide a permanent record of information contained in ultra-sonic signals, in which the pictorial representation includes half tones or various shades intermediate between light and dark so that a more complete representation of the material structure is provided.

Another equally important object is to provide in the same recording system means for reproducing a picture with sharp boundaries so that the light and dark areas appear either black or white. An auxiliary object in this connection is to provide amplitude selection means so that only those flaws of magnitude exceeding a critical value will be detected and displayed.

Another object is to provide in a recording system, means for reversing the polarity of the electrical signal from which the recording is made to the end that positive or negative reproductions are provided of either the half tone or black and white type thereby rendering the equipment adaptable to various different sonic techniques.

Briefly, these and many other objects and advantages of this invention are attained by providing a recording circuit in combination with a conventional sonic circut and sound transmtting and receiving probe. The sonic circuit yields video and synchronizing signals from the transmitted and echo pulses provided by the probe. The video signals are passed into a pulse stretching means which effectively provides a stepped output D.C. signal to operate a facsimile type recording mechanism. Desired half tone effects may be provided in the finally reproduced recording. Alternatively, the recording circuit may be switched to select and generate constant amplitude pulses in response to only video pulses exceeding a predetermined amplitude. By feeding the constant amplitude pulses into the pulse stretcher, the output recording of the facsimile recorder will constitute black or white areas with sharply defined boundries, and only flaws exceeding a given magnitude will be displayed.

The recording circuit also includes polarity reversing means connected between the output of the pulse stretching means and the facsimile recorder so that either positive or negative prints can be made.

A better understanding of the invention as well as certain additional features and advantages thereof will be had by referring to an embodiment thereof as illustrated in the accompanying drawings, in which:

FIGURE 1 is a schematic diagram partly in block form illustrating the ultra-sonic recording system of the invention in a scanning operation for detecting flaws in a material;

FIGURES 2, 3, 4, and 5 illustrate different facsimile type recordings provided in accordance with the apparatus of FIGURE 1;

FIGURE 7 is a block diagram of the recording circuit of FIGURE 1; and

FIGURES 8, 9, 10, and 11 are various time graphs of wave forms useful in explaining the operation of the circuit of FIGURE 7.

Figure 1:
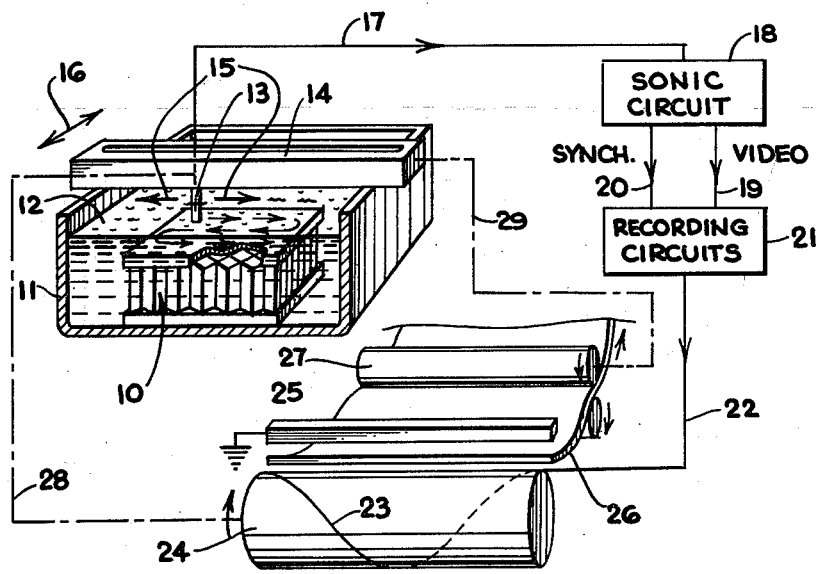

Referring first to FIGURE 1 there is shown by way of example of the operation of the invention, a honeycomb structural material 10 disposed within a tank 11 filled with liquid 12. An ultra-sonic probe 13 in turn is mounted on a carriage riding on a transverse bridge 14 so that it may move to the left and right as indicated by the arrows 15 along the bridge to sweep transversely across the top surface of the material 10. The bridge itself is mounted to move forewardly and rearwardly in the direction of the arrows 16 so that a path covering substantially the entire area of the surface of the material 10 can be traced by the probe 13.

The probe 13 is connected through a line 17 to a sonic circuit 18 which generates video signals and synchronizing signals in response to signals from the probe. These signals pass respectively through lines 19 and 20 to a recording circuit 21. The output of the recording circuit connects through line 22 to an helically wound wire 23 on a cylinder 24 forming part of a conventional facsimile type recording means. The circuit from the helical wire 23 is completed through a conducting bar 25 disposed on the opposite side of a recording medium in the form of sensitized paper 26. The paper 26 is moved between the cylinder 24 and bar 25 as by rollers 27.

Rotation of the cylinder 24 is synchronized with the transverse movement of the probe 13 as indicated by the link 28 so that the position of the wire 23 directly beneath the bar 25 will travel from left to right as the cylinder 24 is rotated at the same rate as the probe 13 moves from left to right.

Similarly, the feeding of the paper 26 by the rollers 27 is synchronized with the forward movement of the bridge 14 so that a similar area corresponding to the surface of the material 10 may be reproduced on the topside of the paper.

In the operation of the ultra-sonic recording system illustrated in FIGURE 1, the liquid 12 serves as an acoustical coupling between the probe 13 and surface of the material 10. The probe 13 and sonic circuit 18 operate to transmit ultra-high frequency sound energy at a given pulse repetition frequency into the material 10 and receive echo signals therefrom. The changes in the amplitude of the echo signals as scanning by the probe takes place will indicate the structural integrity of the material 10. The sonic circuit provides a video signal together with a synchronizing signal generated at the pulse repetition frequency, each time a pulse is transmitted by the probe 13. These signals may be displayed on a conventional oscilloscope.

In accordance with the present invention, however, the video and synchronizing signals are passed to the recording circuit 21 from which an electrical signal is generated in the line 22 for operating the facsimile type recording means and recording medium.

Figure 2:
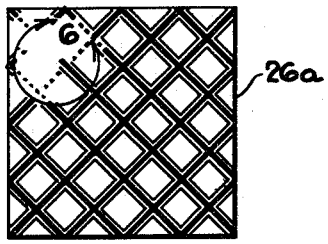

FIGURE 2 illustrates at 26a the appearance of the paper 26 after a given area of the material 10 of FIGURE 1 has been scanned and recorded. As shown, the honeycomb structure is visible and is defined by light and dark areas. In the reproduction shown in FIGURE 2, it will be noted that variations in the degree of lightness and darkness in the form of half or intermediate color tones are provided.

In the example of FIGURE 2 the area shown within the circular arrow 6 is relatively light indicating faults or discontinuities in the material 10. The faults displayed in FIGURE 2 may result from failure of the web portions of the honeycomb to bond to the top skin surface causing open voids. These voids in turn alter the characteristics of the echo signals received in the probe 13 and thus in the output signal from the recording circuit resulting in a change in the pattern recorded on the sensitized paper.

Figure 3:
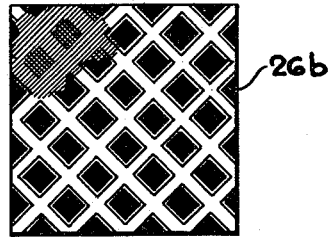

For certain sonic techniques, it may be desirable to reproduce a negative picture of the material being tested rather than the positive picture shown in FIGURE 2. This can be accomplished by suitable circuits within the recording circuit 21 resulting in a picture as illustrated in FIGURE 3 at 26b. In this display, the empty or void places are shown as dark areas whereas the solid web connections are illustrated as light areas. Again the advantages of half tones which indicate, to an extent, the varying thickness of the webs in the honeycomb structure are provided.

Figure 4:
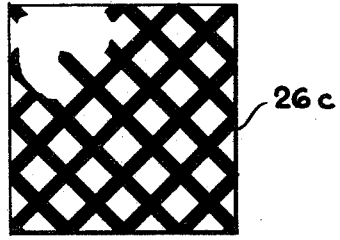

FIGURE 4 illustrates yet another type display possible in accordance with the present invention. In FIGURE 4, the display 26c does not include half tones but is either all white or all black with well defined boundaries. Such a display makes more conspicuous any faults that may be present in certain types of material.

Figure 5:
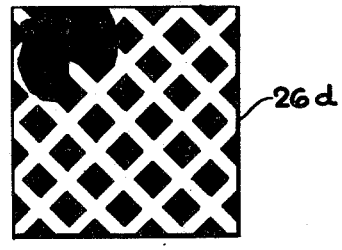

FIGURE 5 illustrates at 26d a negative of the picture displayed in FIGURE 4 wherein faults are indicated by blackened areas and the bonded portions of the structure indicated by the white areas.

Figure 6:
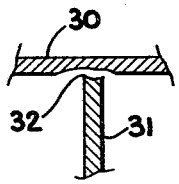
FIGURE 6 illustrates in fragmentary cross sectional view a typical flaw capable of detection by the equipment of the present invention.

FIGURE 6 is a fragmentary cross section of a portion of the honeycomb 10 of FIGURE 1 indicating a section of top skin 30 which normally is bonded to a vertical web 31. In FIGURE 6 there is shown a fault or void at 32 which, in the several adjacent webs as well as the web shown in FIGURE 6 could cause the discontinuities in the displays of FIGURES 2, 3, 4, and 5.

The manner in which the video signals from the sonic set are converted into an electrical signal capable of operating the facsimile recorder to provide the foregoing pictorial representations of the material will now be described.

Referring to FIGURE 7, the input video signals from the line 19 in one branch are passed through a level control 33 which may simply constitute a bias control for clipping the base level of the signals so that only the significant portions of the signals are passed. From the level control 33 the signals are coupled through a cathode follower 34 to a half-tone expanding means 35. Essentially the expanding means 35 amplifies the differences in amplitude of the individual video pulses to values which will match the sensitivity characteristics of the facsimile recording paper 26 of FIGURE 1.

From the half-tone expanding means 35, the video signals pass through a switch arm 36. Switch arm 36 may be moved from its solid to its dotted line position to connect through a line 37 directly to the video input line 19. The switch arm is connected through lead 38 to a video amplifier 39 and cathode follower 40. The output of the cathode follower 40 branches at junction point 41 through branch line 42 to a switch arm 43. This same output also passes from junction point 41 through line 44 into an amplitude selector means 45, square pulse generator 46, and cathode follower 47 to terminate in an output terminal 48. When the second switch arm 43 is moved to its dotted line position, it disconnects from line 42 and connects to terminal 48. The first and second switch arms 36 and 42 are mechanically ganged as indicated by the dashed outline 49 so that both switches are either in their solid line positions or in their dotted line positions. When in their solid line positions, the recording circuit is connected to reproduce half tone variations such as shown in FIGURES 2 and 3. When in the dotted line position, the circuit is connected to provide black and white pictures such as shown in FIGURES 4 and 5.

From the second switch arm 43, a lead 50 passes into a pulse stretching means indicated by the block 51. A discharge circuit including a multi-vibrator 52 triggered by the synchronizing pulse in line 20 and feeding into an amplifier 53 is also connected to the pulse stretching means through line 54. The output of the pulse stretching means connects to a paraphase inverter 55 having two output terminals 56 and 57 designated positive and negative respectively. A third switch arm 58 is arranged to connect either one of the terminals through lead 59 to a coupling cathode follower 60 and a power amplifier 61. The output of the amplifier connects to line 22 of FIGURE 1.

Referring now to FIGURES 8, 9, 10, and 11, the operation of the above-described recording system will be set forth. In FIGURE 8 there are shown by way of example, a series of video pulses 62, 63, 64, 65, 66, 67, and 68. These video pulses have varying amplitudes which are a function of the respective echoes received at the pulse repetition frequency at which sound pulses are transmitted by the probe 13. For example, if the probe is held in one position so that the material into which the transmitted sound energy passes is of a constant structural characteristic, the various echoes received at the pulse repetition rate will all be of substantially the same amplitude. As the probe 13 of FIGURE 1 is moved over the surface of the material, the characteristics of the echo signals will vary depending upon the structural variations in the material. The synchronizing signal received on the line 20 of FIGURE 7 occurs at the pulse repetition frequency and serves in the sonic circuit 18 of FIGURE 1 to initiate a gate which will gate the particular video signal corresponding to the echo associated with such synchronizing pulse.

The gated pulses 62 through 68 in passing through the level control 33 of FIGURE 7 have their base levels clipped as a group. Thus, in FIGURE 8 the base line 69 is effectively moved up or down with respect to the video signals by varying the level control. This control thus is analogous to the brightness control on a television set. In the example, the base line 69 would be moved up to line 70.

In passing through the half tone expanding means 35, the differences in the amplitude of the individual video signals 62 to 68 are amplified. In other words, the portions of the signals between the horizontal dashed lines 70 and 71 are amplified or explanded and this control thus is analogous to the contrast control on a television set. With the first and second switch arms 36 and 42 in their solid line positions, the expanded or amplified video pulses are further amplified in the video amplifier 39 and coupled through the cathode follower 40, line 42, and switch arm 43 to the pulse stretching means 51. The pulse stretching means may include any of a variety of well-known circuits responsive to an initiating pulse for providing an output pulse of sustained time duration. There is thus effectively provided a "stretched" pulse or wave form for a given time duration and at a voltage level corresponding to the amplitude of the initiating pulse. Termination of the voltage level established by the pulse stretcher is effected in accordance with the present invention each time a synchronizing pulse is received by means of the discharge circuit including the multi-vibrator 52 and amplifier 53.

Thus, referring to FIGURE 9, the reception of the first video pulse 62 results in a sustained voltage level until the synchronizing pulse which initiates the generation of the next video pulse 63 is received. At this point, the voltage is discharged but is immediately built up to a new amplitude determined by the amplitude of the pulse 63. The process is repeated for the pulses 64, 65, 66, 67 and 68 as indicated by the corresponding primed numerals in FIGURE 9. There thus results a stepped D.-C. electrical signal 72. This electrical signal 72, in passing through the paraphase inverter 55 of FIGURE 7 is reproduced as a positive wave form at the positive output terminal 57 and as a negative wave form at the negative output terminal 58 as shown at 72′ in FIGURE 10.

If the switch arm 58 is in its solid line position on terminal 57, a positive half tone reproduction will be provided on the paper 26 as indicated at 26a in FIGURE 2. The tonal quality is a result of the variations in the amplitude of the D.-C. electrical signal depicted by the curve 72. The higher the voltage level, the darker will be the markings on the recording paper. Similarly a negative reproduction as shown at 26b in FIGURE 3 will result if the switch arm 58 is moved to its dotted line position. In this connection, the reference voltage level in respect to the wave form 72′ of FIGURE 10 is positioned as at 73 so that the actual step function fed to the recorder represents positive variations which change in an inverse manner to the wave form of FIGURE 9. As in the case of FIGURE 9, the greater the voltage, the darker will be the marking.

When it is desired to produce a black and white picture as indicated in FIGURES 4 and 5, the first and second switch arms 36 and 43 are thrown to their dotted line positions. In these positions, the video signals shown in FIGURE 8 pass directly to the video amplifier 39 and cathode follower 40 to the line 44, amplitude selector 45, square pulse generator 46 and cathode follower 47. The amplitude selector provides an output only in response to video pulses which exceed a given amplitude level. For example, referring again to FIGURE 8 there is shown a dashed dot line 74 which, in the example taken for illustrative purposes could represent the setting of the amplitude selector 45. In this case, only video pulses 62, 63, 64, 66 and 68 would be passed through the amplitude selector while the pulses 65 and 67 would be blocked. The pulses passed by the amplitude selector trigger the square pulse generator which may constitute a shot multi-vibrator to provide output pulses of constant amplitude. These output pulses are indicated at 62a, 63a, 64a, 66a, and 68a in FIGURE 11.

When these constant amplitude pulses are received in the pulse stretcher through the cathode follower 47 and switch arm 42 in its dotted line position each pulse is stretched out for a duration equal to the period of the pulse repetition frequency. This stretching of the pulses is indicated by the dashed lightly shaded areas in FIGURE 11.

It will be evident accordingly that in the black and white position, the output of the pulse stretcher is a D.-C. signal of a constant amplitude level for successive video pulses exceeding the pre-determined selected amplitude in the circuit 45. For video pulses which fall below the selected amplitude, there will be no signal. Thus, voids will appear in the output signal as indicated in FIGURE 11 between the pulses 64a and 66a and 68a and 66a. When the output signal is fed into the facsimile recorder of FIGURE 1, the pictures will appear as shown in FIGURES 4 and 5.

By varying the amplitude selector, the type of faults it is desired to detect may be varied. In other words, there may be certain faults which are not serious enough to warrant correction. The echo signals indicative of these faults can be blocked and only echoes resulting from major faults received and reproduced on the facsimile paper.

As in the case of the half-tone circuit portion, the black and white signals may be inverted in polarity to provide negative prints as described heretofore.

From the foregoing description, it will be evident that the present invention has provided a greatly improved ultra-sonic recording system wherein facsimile type recordings of the physical characteristics of certain materials may be made directly from the scanning process. Further, the features of enabling either half tones, black and white, positive, and negative reproductions render the equipment adaptable to many different types of sonic techniques.

While only a preferred embodiment of the invention has been described, various modifications falling within the scope and spirit of the invention will occur to those skilled in the art. The ultra-sonic recording system is therefore not to be thought of as limited to the particular examples set forth merely for illustrative purposes.

What is claimed is:
1. An ultra-sonic recording system for reproducing in a two-dimensional projection and a photograph-like and substantially continuous representation, as distinguished from a representation by means of a series of discrete lines and from a representation by means of a series of discrete points, the three-dimensional structural characteristic of an object having substantial extension also in the third, projected dimension, said system comprising, in combination: a probe member for transmitting ultra-sonic energy at a given pulse repetition frequency into said material and receiving reflected echo signals of amplitude dependent upon the structural integrity of said material; probe moving means for moving said probe over said material in a pattern to cover a given area defined by the first mentioned two dimensions of the material; a sonic circuit connected to said probe for providing synchronization pulses each time a pulse of energy is transmitted by said probe and video signals of amplitude that are functions of said echo signals each time said echoes are received by said probe; a recording circuit connected to said sonic circuit, said recording circuit including electrical signal generating means responsive to said synchronization pulses and said video pulses for generating electrical signals of given time durations, the amplitude levels of said electrical signals constituting a function of the amplitudes of said video pulses; and a facsimile recorder connected to said recording circuit and including a recording medium and recording means responsive to movements of said probe for reproducing from said electrical signals in said two-dimensional projection and photograph-like and substantially continuous representation, a pattern of light and dark areas on said given recording medium corresponding to the configuration and structural characteristics of said material as detected by said probe, said electrical signal generating means in said recording circuit including pulse stretching means responsive to each of said video pulses to provide sustained voltage levels corresponding to the amplitudes of each of said video pulses; and a discharge means responsive to each of said syn- chronization pulses for discharging said voltage levels established by the video pulses.

2. The subject matter of claim 1, in which said recording circuit includes inverter means connected to said pulse stretching means and having two output terminals providing respectively positive and negative reproductions of said electrical signals for connection to the input of said recording means.

3. The subject matter of claim 2, in which said recording circuit includes a level control for clipping the reference base line of said video pulses so that only the significant portions representing the amplitude differences therebetween are passed to said pulse stretching means.

4. The subject matter of claim 3, in which said recording circuit includes expanding means for amplifying said amplitude differences of said video pulses to increase the contrast in said light and dark areas on said recording medium.

5. The subject matter of claim 2, in which said recording circuit includes amplitude selecting means for blocking all video pulses less than a predetermined amplitude from said pulse stretching means and passing constant amplitude pulses to said pulse stretching means in response to all video signals greater than said predetermined amplitude whereby said light and dark areas have defined boundaries.

References Cited in the file of this patent

UNITED STATES PATENTS

| | | |
|---|---|---|
| 2,237,645 | Whitaker | Apr. 8, 1941 |
| 2,545,463 | Hester | Mar. 20, 1951 |
| 2,638,500 | Ernst | May 12, 1953 |
| 2,688,697 | Lawson et al. | Sept. 7, 1954 |
| 2,709,716 | Haller | May 31, 1955 |
| 2,809,298 | Cawein | Oct. 8, 1957 |
| 2,921,126 | Street et al. | Jan. 12, 1960 |
| 2,971,372 | Lewis et al. | Feb. 14, 1961 |